(12) United States Patent
Dougherty et al.

(10) Patent No.: US 6,466,023 B2
(45) Date of Patent: Oct. 15, 2002

(54) METHOD OF DETERMINING CONTACT WEAR IN A TRIP UNIT

(75) Inventors: John J. Dougherty, Collegeville, PA (US); Bo L. Andersen, Burlington, CT (US)

(73) Assignee: General Electric Company, Schenectady, NY (US)

( * ) Notice: Subject to any disclaimer, the term of this patent is extended or adjusted under 35 U.S.C. 154(b) by 31 days.

(21) Appl. No.: 09/778,698

(22) Filed: Feb. 7, 2001

(65) Prior Publication Data

US 2001/0019573 A1 Sep. 6, 2001

Related U.S. Application Data

(63) Continuation-in-part of application No. 09/221,884, filed on Dec. 28, 1998, now Pat. No. 6,231,227.

(51) Int. Cl.$^7$ ................................. G01R 31/02
(52) U.S. Cl. ................. 324/424; 324/422; 361/93.2; 702/64
(58) Field of Search ............... 361/93.2, 60; 702/64, 702/65, 57, 189, FOR 103, FOR 104, FOR 106; 324/424, 420, 421, 422, 423

(56) References Cited

U.S. PATENT DOCUMENTS

| | | | |
|---|---|---|---|
| 3,835,278 A | * 9/1974 | Pocock | 200/249 |
| 4,620,156 A | * 10/1986 | Alvin et al. | 324/424 |
| 4,780,786 A | * 10/1988 | Weynachter et al. | 324/424 |
| 4,901,061 A | 2/1990 | Twerdochlib | |
| 5,216,623 A | 6/1993 | Barrett et al. | |
| 5,270,658 A | 12/1993 | Epstein | |
| 5,604,437 A | * 2/1997 | Moncorge et al. | 324/424 |
| 5,697,705 A | 12/1997 | Callewaert | |
| 5,859,596 A | * 1/1999 | McRae | 200/262 |
| 5,883,568 A | 3/1999 | Boyden | |
| 5,941,370 A | 8/1999 | Nichols | |
| 6,023,036 A | 2/2000 | Nichols | |

FOREIGN PATENT DOCUMENTS

| | | |
|---|---|---|
| JP | 58-17326 | 2/1983 |
| WO | WO 98/11573 | 3/1998 |

\* cited by examiner

*Primary Examiner*—N. Le
*Assistant Examiner*—Vincent Q. Nguyen
(74) *Attorney, Agent, or Firm*—Cantor Colburn LLP

(57) ABSTRACT

A method of determining contact wear in a trip unit of a circuit breaker and a circuit breaker employing such a method are presented. The trip unit includes a microcontroller and associated memories. An algorithm (program) stored in a memory of the trip unit calculates cumulative energy dissipated in the breaker contacts using the current signal detected at the time of separation. Measurement of cumulative energy dissipated in the breaker contacts is proportional to contact wear. Maintenance setpoints are determined based on industry standard endurance tests and alarm threshold and trip thresholds further based on industry standards are provided within the algorithm for notifying local or remote personnel of a necessary maintenance procedure.

40 Claims, 2 Drawing Sheets

METHOD OF DETERMINING CONTACT WEAR IN A TRIP UNIT

CROSS-REFERENCE TO RELATED APPLICATIONS

This application is a continuation-in-part of U.S. patent application No. 09/221,884 Now U.S. Pat No. 6,231,227 entitled "A Method Of Determining Contact Wear In A Trip Unit" filed Dec. 28, 1998, pending.

BACKGROUND OF THE INVENTION

This invention relates generally to electronic trip units, and more particularly, this invention relates to a method and circuit breaker for determining contact wear of the circuit breaker at an electronic trip unit.

Electronic trip units are well known. An electronic trip unit typically comprises voltage and current sensors which provide analog signals indicative of the power line signals. The analog signals are converted by an A/D (analog/digital) converter to digital signals which are processed by a microcontroller. The trip unit further includes RAM (random access memory), ROM (read only memory) and EEPROM (electronic erasable programmable read only memory) all of which interface with the microcontroller. The ROM includes trip unit application code, e.g., main functionality firmware, including initializing parameters, and boot code. The EEPROM includes operational parameters for the application code. An output of the electronic trip unit actuates a circuit breaker. The circuit breaker typically includes a pair of contacts which allows circuit current to pass from one contact member to another contact member. When the contacts open, circuit current is prevented from flowing from one contact member to the other and therefore, circuit current is prevented from flowing to a load which is connected to the breaker.

Circuit breaker contact wear is a frequently occurring yet difficult to measure or predict problem because it is affected by a variety of factors. Contact wear is affected by the cumulative energy dissipated through arcing as breakers are opened. However, a single severe over-current fault can destroy contacts more quickly than several smaller faults, even though the smaller faults may add up to the same total energy dissipated. Merely counting the number of faults experienced by a breaker may not give an accurate assessment of contact wear. Contacts are not generally easily inspected without costly disassembly and power down. However, if not detected, contact wear may result in loss of power.

The only current solution to this is defensive preventative maintenance, whether required or not. Industrial plants, however, typically have fewer maintenance personnel than is necessary to adequately provide this preventative maintenance. Additionally, in many instances, there are no clear guidelines for replacing circuit breakers as a function of actual service duty. Power management systems may connect to low voltage circuit breaker trip units and provide breaker status, but they do not provide a systematic approach to measuring and reporting on breaker health on a condition basis. Scheduled, preventative maintenance is the only option. Thus, there are correspondingly no reliable methods for identifying breaker health remotely in low voltage circuit breakers.

BRIEF SUMMARY OF THE INVENTION

The above discussed and other drawbacks and deficiencies are overcome or alleviated by a method of detecting contact wear of a pair of separable contacts in an electronic trip unit of a circuit breaker. The method comprises issuing a trip or open signal to initiate a separation of said pair of separable contacts; detecting the separation of said pair of separable contacts; sensing current through said pair of contacts to provide a sensed current signal indicative thereof; and integrating the sensed current signal after separation of said pair of separable contacts is detected to result in a first measurement proportional to contact wear of said contacts.

Similarly, a breaker assembly comprising an electronic trip unit and a circuit breaker having at least one pair of separable contacts, also includes means for detecting separation of said at least one pair of separable contacts; a current sensor positioned for sensing current through said at least one pair of separable contacts to provide a sensed current signal indicative thereof; and, a signal processor responsive to said first sensed current signal, and having memory for storing signals including program signals defining an executable program, wherein said processor integrates said first sensed current signal to after separation of said at least one pair of separable contacts is detected to result in a first measurement proportional to contact wear of said contacts.

The above discussed and other features and advantages of the present invention will be appreciated and understood by those skilled in the art from the following detailed description and drawings.

BRIEF DESCRIPTION OF THE DRAWINGS

Referring to the FIGURES. herein like elements are numbered alike in the several FIGURES.

DETAILED DESCRIPTION OF THE INVENTION

Figure 1:
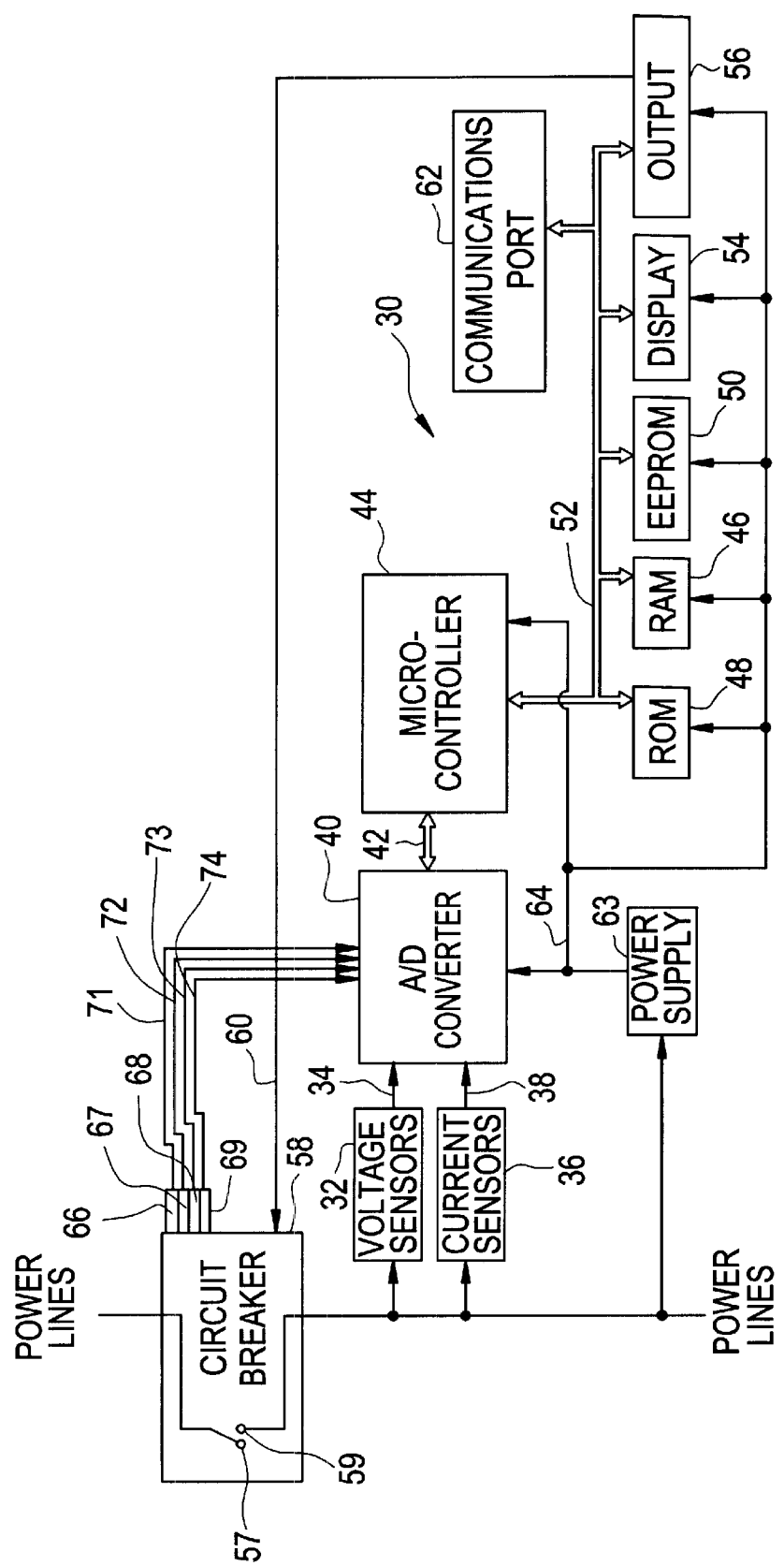
FIG. 1 is a schematic block diagram of an electronic trip unit of the present invention.

Referring to FIG. 1, a general schematic of an electronic trip unit of the present invention is generally shown at 30. Trip unit 30 comprises a voltage sensor or sensors 32 which provides analog signals indicative of voltage measurements on a signal line 34 and a current sensor or sensors 36 which provides analog signals indicative of a current measurements on a signal line 38. The analog signals on lines 34 and 38 are presented to an A/D (analog/digital) converter 40, which converts these analog signals to digital signals. The digital signals are transferred over a bus 42 to a microcontroller (signal processor) 44, such being commercially available from the Hitachi Electronics Components Group (Hitachi's H8/300 family of microcontrollers). Trip unit 30 further includes RAM (random access memory) 46, ROM (read only memory) 48 and EEPROM (electronic erasable programmable read only memory) 50 all of which communicate with the microcontroller 44 over a control bus 52. It will be appreciated that A/D converter 40, ROM 48, RAM 46, or any combination thereof may be internal to microcontroller 44, as is well known. EEPROM 50 is non-volatile so that system information and programming will not be lost during a power interruption or outage. Data, typically status of the circuit breaker, is displayed by a display 54 in response to display signals received from microcontroller 44 over control bus 52. An output control device 56, in response to control signals received from microcontroller 44 over control bus 52, controls a circuit breaker 58 via a line 60. Circuit breaker 58 includes a pair of separable contacts 57, 59 for each phase of the circuit breaker 58.

A plurality of temperature sensors 66–69 may be located within circuit breaker 58. Temperature sensors 66–68 are each located in close proximity to contacts for phase A, B and C, respectively. The exact location of the sensors is not critical as it will be different for various circuit breakers. What is important is that these temperature sensors 66–68 be located relative to their respective contacts to provide an indication of temperature at that contact. Temperature sensor 69 is also located in circuit breaker 58, however it is located away from the contacts of the circuit breaker to sense ambient temperature within the circuit breaker itself. The temperature sensors 66–69 may be simple thermocouple devices which provide an analog signal indicative of the sensed temperature. These temperature sensed analog signals on lines 71–74 are presented to A/D converter 40, where they are converted to digital signals. These digital signals are then transferred over bus 42 to microcontroller 44 and processed in accordance with the present invention.

Calibration, testing, programming and other features are accomplished through a communications I/0 port 62, which communicates with microcontroller 44 over control bus 52. A power supply 63 which is powered by the service electricity or current transformer (CT power), provides appropriate power over a line 64 to the components of trip unit 30. ROM 48 includes trip unit application code, e.g., main functionality firmware, including initializing parameters, and boot code. The application code includes code for a contact wear detection algorithm as described below.

EEPROM 50 includes operational parameter code, e.g., code for setting user defined thresholds for the contact wear detection algorithm. These parameters may be stored in the trip unit at the factory and are selected to meet customers' requirements, but can also be remotely downloaded as described hereinafter. The contact wear detection algorithm is run in real-time and is initiated preferably from the boot code at start up.

The contact wear detection algorithm (program) of the present invention may calculate differential temperatures between each contact sensor 66–68 and the ambient sensor 69, and differential temperatures between the contacts sensors 66–68, i.e., the difference between sensor 66 (phase A) and sensor 67 (phase B), the difference between sensor 67 (phase B) and sensor 68 (phase C), and the difference between sensor 68 (phase C) and sensor 66 (phase A). The contact wear detection algorithm may then estimate resistance of contacts based on contact heat rise over ambient temperature and compare the results to a stored table of expected heat rises as a function of current. For example, if current in phase A is 400 amps, ambient temperature 90 degrees, and contact temperature of phase A is 140 degrees, then heat rise over ambient is 140−90=50 degrees. If the stored table in this example shows the expected heat rise at 400 amps current to be only 30 degrees, and if an alarm threshold is set to allow only a 10 degree deviation (or 40 degrees) then an alarm will be issued.

Also, OHM's law resistance-in-contact =voltage-across-contact divided by current-through-contact (AC phase adjusted) may be used to calculate the contact resistance which is compared against a stored maximum allowable value. Thereby allowing for alternate means of assessing this parameter for each breaker contact.

In accordance with another embodiment of the present invention a statistical standard deviation analysis of these differential temperatures relative to. predefined differential temperature means (arithmetic) is used to identify eminent severe failures. Alternatively, these differential temperatures are compared to pre-set maximum acceptable values and an alarm is used when a maximum value is exceeded. In still another alternative, the circuit breaker geometry is thermodynamically molded, i.e., current through the circuit breaker contacts, contact temperatures, ambient temperatures, and a maximum acceptable contact resistance constant are used to calculate a predicted contact resistance. An alarm is issued when the predicted contact resistance exceeds the maximum. Thermodynamic and electrical modeling of the circuit breaker will be readily apparent to one of ordinary skill in the art, using basic thermodynamic and electrical equations and known modeling tools. The method of such modeling is not critical to the present invention, rather this is simply another method for comparing the sensed temperatures to benchmarks or limits, for assessing contact wear.

The present invention may also measure wear in low voltage circuit breakers and contactors by measuring the energy of the arc, which occurs when the device opens. This measurement provides a by-phase assessment of breaker contact duty and can warn of replacement / maintenance conditions as a function of the duty actually seen by the breaker. This duty information may be provided remotely to a local terminal (over factory LAN) or the Internet to a remote internal or external service provider.

For each trip event and manual opening of an energized breaker, a measure of the energy dissipated as breakers are opened is calculated as $(I^2)(T)$, where I is the contact current and T is the fixed time between samples. This energy dissipation is calculated and then summed up in registers of the microcontroller for each contact and for each fault type, e.g., short-time, long-time, ground fault, instantaneous, and manual, to provide cumulative fault energy by fault type or total.

Electronic protection devices such as overload relays and trip units measure current, in digital implementations by sampling, as part of their basic protective function. For the breaker health function, the current may be measured and squared during the period of time that the device contacts are parting due to trip or opening.

The wear of circuit breaker contacts is a function of the current flowing at the time of interruption. There are two effects: higher current causes wear by higher heating at the contact surface and higher current tends to arc for a longer period before the circuit breaker interrupts. The wear of contacts is proportional to the integration of the square of the line current during interruption.

Figure 2:
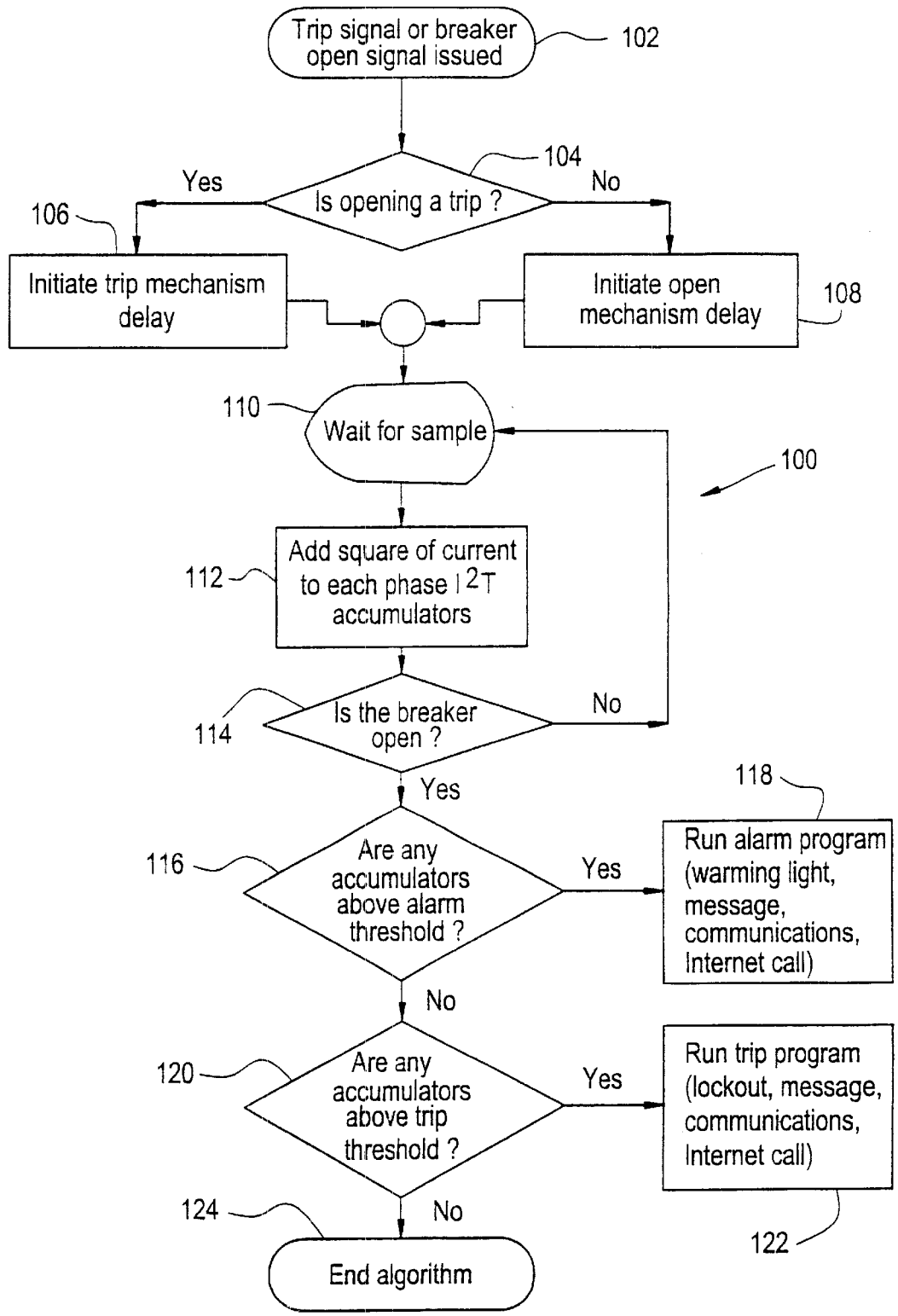
FIG. 2 is a flowchart of a breaker health algorithm usable with the electronic trip unit of FIG. 1.

Referring to FIG. 2, an exemplary embodiment of a flow diagram of a contact wear algorithm to accumulate $I^2T$ information is shown generally at 100. In digital implementations, a fixed sampling scheme may be employed. As such the integration is simply the summation of the square of each current sample. Note that the current is sampled and stored separately for each phase current. The mechanism timer is a fixed time delay which represents the time from issuing the electronic signal to trip the circuit breaker to the time when the breaker or contactor contacts begin to move. This can be measured or estimated based on typical mechanism times and manufacturer's published interruption times. Other means for detecting the separation of the contacts is within the scope of this invention. It should be noted that the samples, or the sensed current signals, are not taken until the contacts separate and samples are taken until the breaker is opened, that is, until current is no longer transferred between the contacts. The fixed time between the samples is the time T used in the algorithm. Also, it should be noted that the temperature sensors 66–69, associated lines 71–74, and the voltage sensors 32, and associated line 34, shown in FIG. 1, are not necessary for this embodiment.

The contact wear algorithm 100 (program) is initiated at block 102 when a trip signal or breaker open signal is issued. The program determines at block 104 whether the opening is a trip or not and initiates the appropriate trip mechanism delay or open mechanism delay as shown at blocks 106 and 108, respectively. After the trip signal has been issued (block 102) and the mechanism timer completes its delay (blocks 106, 108), the current samples for each phase, as demonstrated by block 110, are squared and stored in an accumulator (1 per phase), as demonstrated by block 112. Each of these samples is implicitly multiplied by the fixed time between samples to result in an $I^2T$ accumulation. Also, empirical constants may be assigned to the cumulate fault energy for different fault types to make, e.g., ground faults more severe than manual openings. If the breaker is not yet opened, as determined at block 114, then the program loops back to block 110.

If the breaker is opened, as determined at block 114, then the cumulated fault energy by fault type or total is compared to alarm thresholds at block 116 (which may be set by the user and stored in EEPROM 50) with alarms being issued at block 118 when the alarm threshold is exceeded. An alarm may include one or any combination of a warning light, message, communication, Internet call, etc.

When any of the phase accumulators exceeds the defined threshold, a flag is set to indicate a wear condition exists. This wear condition will be settable by the customer and based on multiples (10% to 100%) of several published industry standards for load duty cycle. For example, UL requires that molded case circuit breakers pass a given number of load cycles (typically 15) at 6 times rated current. These interruptions have a defined power factor and current level which results in a given accumulated $I^2T$ for the breaker in question. Similarly, standards require endurance tests with the breaker loaded at full rating. Given these guaranteed operational requirements, a breaker capacity $I^2T$ measure equal to the endurance and load cycle tests can be established. The threshold for the maintenance should not be set for more than 100% of the breaker capacity. Similarly, setpoints can be provided on an ANSI or IEC basis. The threshold represents a percentage of the proven breaker performance.

The recording of $I^2T$ for the circuit breaker during qualification to a published standard (UL, IEC, etc.) and then representing maintenance setpoints as multiples or submultiples of UL or IEC or ANSI endurance tests makes the $I^2T$ measure a comparative measure (using $I^2T$ both in measuring the endurance results and in the ongoing operation in the product). Measurement of the nonlinear arc voltage E or resistance R becomes less important and using only current I is preferred as the circuit breaker already measures current.

A priority ranking of maintenance tasks for maintaining circuit breakers may be established based on this information, i.e., which circuit breaker will require maintenance first due to contact wear. Many large facilities have hundreds of circuit breakers to maintain. Users typically overhaul a certain percentage of their circuit breakers annually. Therefore accurately prioritizing the order in which individual circuit breaker problems should be addressed will allow for more effective use of limited resources, and help decrease facility down time.

If the program determines at block 116 that an accumulator is not above the alarm threshold, then block 120 will determine whether or not an accumulator is above a trip threshold. If an accumulator is above a trip threshold, then a trip program will be run at block 122. A trip program may include on or any combination of lockout, messages, communications, Internet calls, and similar functions. More specifically, the following optional actions may be taken:

1. The trip unit or relay locks out operation of the device until a maintenance procedure clears the wear problem (at which time the accumulators are reset to zero).

2. A local trip unit or relay indicator or message is provided.

3. A remote communication through a communication link, such as over a local communications bus within a local area network (LAN), alerts a factory worker of the problem.

4. A remote communication through a power management system to the Internet alerts a remote company employee.

5. A remote communication through a power management system to the Internet alerts a remote service provider who notifies the customer or schedules maintenance to fix the device.

6. A remote communication directly to the Internet or company intranet from the trip unit or relay with suitable communication capabilities.

In addition, multiple setpoints may be provided to first warn, then lockout operation. The lower setpoint provides time to schedule a maintenance operation during a "down" period.

If an accumulator is not above a trip threshold, then the algorithm 100 will stop at block 124, and restart again at block 102 when another trip signal or breaker open signal is issued.

All of the aforementioned limits or settings (e.g. alarm and trip thresholds) are preferably stored in EEPROM 50 and can be altered by downloading desired settings via communications I/O port 62. This would include remotely downloading such data when the unit is connected to a system computer (not shown), either directly, over the telephone lines, or any other suitable connection. It may also be preferred that EEPROM 50 comprises a flash memory whereby such data is flashed, as is well known.

As described above, a breaker health algorithm may measure and integrate $I^2T$ during fault and normal breaker opening conditions in low voltage circuit breaker trip units. The industry standards (UL, ANSI, IEC) for circuit breaker performance provide the baseline for detecting breaker health and determining need for breaker maintenance or replacement. A link over the Power Management system LAN and/or Internet provides both internal and external services response to the problem.

Note that other variants of this disclosure could estimate the $I^2T$ for each opening or trip using stored or estimated arc energies based on the conditions prior to opening or an average estimated value. Variations of this wear measure can include EIT which measures the voltage across the contact and multiplies it by the instantaneous current. While this is an improvement on the simpler $I^2T$ approach which assumes a constant arc voltage, it requires three additional voltage sensors across the contacts which are useful only during the interruption. Given the relationship E=IR where I is current and R is the resistance in the arc, an alternative calculation is $I^2RT$, however, R is unknown and non-linear at times during the arc. IT simply integrates current during the arc. Although less accurate, simpler trip units may employ such estimation means at a lower cost. The measure of $I^2T$ or even IT is a compromise measure which is proportional to the total energy in the contacts during interruption.

In terms of communicating contact wear information, this can occur in several ways: (1) generating an event message to be transmitted via a network connection to an attached computer (not shown) or other central monitoring device (not shown); (2) displaying a message on display 54 of the trip unit or breaker; or (3) closing a relay contact which in turn may be used to operate a horn, warning light or other alarm (not shown). Contact wear information may also be displayed (or printed) in the form of a log. Information of, e.g., accelerated contact wear, is useful as an aid in determining the cause or root (i.e., systemic root cause) of a problem that may otherwise be difficult to determine. Finally, the actual accumulation of $I^2T$ information can be communicated to a local or remote site for further analysis, accounting for environmental and other conditions.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of detecting contact wear of a pair of separable contacts in an electronic trip unit of a circuit breaker, the method comprising:
   (a) issuing a trip or open signal to initiate a separation of said pair of separable contacts;
   (b) detecting the separation of said pair of separable contacts;
   (c) sensing current through said pair of contacts to provide a sensed current signal indicative thereof; and
   (d) integrating the sensed current signal after separation of said pair of separable contacts is detected and multiplying the sensed current signal to a fixed time T between each sensed current signal to result in a first measurement proportional to contact wear of said contacts.

2. The method of claim 1 further comprising the steps of measuring voltage across the contacts to provide a voltage signal thereof and multiplying the first measurement by the voltage signal to result in another measurement proportional to contact wear of said contacts.

3. The method of claim 1 further comprising programming the method within a read only memory.

4. The method of claim 1 further comprising the step of
   (e) multiplying the first measurement to the sensed current signal, to measure the energy dissipated as the pair of separable contacts separate, resulting in a second measurement proportional to contact wear of said contacts.

5. The method of claim 4 wherein detecting the separation of said pair of separable contacts comprises initiating a mechanism timer for a predetermined time period.

6. The method of claim 4 further comprising repeating steps (b) through (e) until the breaker is opened.

7. The method of claim 6 further comprising storing each second measurement in an accumulator to provide a summation of all second measurements.

8. The method of claim 7 further comprising providing separate accumulators for different fault types including ground fault, instantaneous, and manual and providing separate accumulators for each phase of the circuit breaker.

9. The method of claim 7 further comprising setting maintenance setpoints as multiples of industry standard endurance tests, comparing the summation to the maintenance setpoints, and checking the contacts when the summation reaches a setpoint.

10. The method of claim 9 further comprising replacing worn contacts.

11. The method of claim 7 further comprising setting an alarm threshold and comparing the summation in the accumulator to the alarm threshold after the breaker is opened.

12. The method of claim 11 wherein setting an alarm threshold comprises determining operational capabilities of the circuit breaker based on industry standards and selecting a percentage less than 100% of proven breaker performance as the alarm threshold.

13. The method of claim 11 wherein setting the alarm threshold comprises entering the alarm threshold in an electronic erasable programmable read only memory.

14. The method of claim 11 further comprising running an alarm program if the summation is above the alarm threshold.

15. The method of claim 14 wherein running an alarm program includes communicating through a power management system to remote personnel using an Internet or Intranet connection.

16. The method of claim 14 wherein running an alarm program includes communicating to personnel via a local area network.

17. The method of claim 11 further comprising setting a trip threshold and comparing the summation in the accumulator to the trip threshold after the breaker is opened.

18. The method of claim 17 wherein setting the trip threshold comprises entering the trip threshold in an electronic erasable programmable read only memory.

19. The method of claim 17 further comprising running a trip program if the summation is above the trip threshold.

20. The method of claim 19 wherein running a trip program includes communicating through a power management system to remote personnel using an Internet or Intranet connection.

21. The method of claim 19 wherein running a trip program includes communicating to personnel via a local area network. worn contacts.

22. The method of claim 19 wherein running a trip program includes locking out operation of the circuit breaker.

23. The method of claim 22 further comprising setting the accumulator to zero.

24. A breaker assembly comprising an electronic trip unit and a circuit breaker having at least one pair of separable contacts, said breaker assembly further comprising:
   means for detecting separation of said at least one pair of separable contacts;
   a current sensor positioned for sensing current through said at least one pair of separable contacts to provide a sensed current signal indicative thereof; and,
   a signal processor responsive to said first sensed current signal, and having memory for storing signals including program signals defining an executable program, wherein said processor integrates said first sensed current signal to after separation of said at least one pair of separable contacts is detected and multiplying the sensed current signal to a fixed time T between each sensed current signal to result in a first measurement proportional to contact wear of said contacts.

25. The breaker assembly of claim 24 further comprising a voltage sensor for measuring voltage across the contacts to provide a voltage signal thereof and wherein the processor multiplies the first measurement by the voltage signal to result in another measurement proportional to contact wear of said contacts.

26. The breaker assembly of claim 24 further comprising an Internet or Intranet connection to a power management system.

27. The breaker assembly of claim 24 further comprising a connection to a local communications bus.

28. The breaker assembly of claim 24 wherein the memory is a read only memory.

29. The breaker assembly of claim 24 further comprising an analog to digital converter for receiving the sensed current signal and a bus for transferring digital signals from the analog to digital converter to the processor.

30. The breaker assembly of claim 24 wherein said means for detecting the separation of said at least one pair of separable contacts comprises a mechanism timer.

31. The breaker assembly of claim 24 wherein the processor further multiplies the first measurement to the sensed current signal, to measure the energy dissipated as the pair of separable contacts separate, resulting in a second measurement proportional to contact wear of said contacts.

32. The breaker assembly of claim 31 further comprising an accumulator for storing and providing a summation of all second measurements.

33. The breaker assembly of claim 32 further comprising separate accumulators for different fault types including ground fault, instantaneous, and manual and providing separate accumulators for each phase of the circuit breaker.

34. The breaker assembly of claim 32 further comprising an electronic erasable programmable read only memory storing a trip threshold for comparison to the summation in the accumulator after the breaker is opened.

35. The breaker assembly of claim 34 wherein the processor further comprises memory storing a trip program initiated after the breaker is opened if the summation in the accumulator is above the trip threshold.

36. The breaker assembly of claim 32 further comprising an electronic erasable programmable read only memory storing an alarm threshold for comparison to the summation in the accumulator after the breaker is opened.

37. The breaker assembly of claim 36 wherein the processor further comprises memory storing an alarm program initiated after the breaker is opened if the summation in the accumulator is above the alarm threshold.

38. The breaker assembly of claim 37 wherein the alarm threshold is a percentage less than 100% of operational capabilities of the circuit breaker based on industry standards.

39. A method of detecting contact wear of a pair of separable contacts in an electronic trip unit of a circuit breaker, the method comprising:

(a) providing separate accumulators for different fault types including ground fault, instantaneous, and manual;

(b) issuing a trip or open signal to initiate a separation of said pair of separable contacts;

(c) detecting the separation of said pair of separable contacts;

(d) sensing current through said pair of contacts to provide a sensed current signal indicative thereof;

(e) integrating the sensed current signal after separation of said pair of separable contacts is detected to result in a first measurement proportional to contact wear of said contacts;

(f) multiplying the first measurement to the sensed current signal, to measure the energy dissipated as the pair of separable contacts separate, resulting in a second measurement proportional to contact wear of said contacts;

(g) storing the second measurement in an accumulator corresponding to its fault type to provide a summation of all second measurements by fault type;

repeating steps (c) through (g) until the breaker is opened.

40. A method of detecting contact wear of a pair of separable contacts in an electronic trip unit of a circuit breaker, the method comprising:

(a) issuing a trip or open signal to initiate a separation of said pair of separable contacts;

(b) detecting the separation of said pair of separable contacts;

(c) sensing current through said pair of contacts to provide a sensed current signal indicative thereof;

(d) integrating the sensed current signal after separation of said pair of separable contacts is detected to result in a first measurement proportional to contact wear of said contacts; and (e) measuring voltage across the contacts to provide a voltage signal thereof and multiplying the first measurement by the voltage signal to result in another measurement proportional to contact wear of said contacts.

* * * * *